United States Patent [19]

Young

[11] 4,226,654
[45] Oct. 7, 1980

[54] MANUFACTURE OF TIRES

[75] Inventor: Maurice A. Young, Birmingham, England

[73] Assignee: Dunlop Limited, London, England

[21] Appl. No.: 897,442

[22] Filed: Apr. 18, 1978

[30] Foreign Application Priority Data

May 3, 1977 [GB] United Kingdom ............... 18547/77

[51] Int. Cl.² ............................................. B29H 17/08
[52] U.S. Cl. ................................. 156/123 R; 152/350; 152/357 R
[58] Field of Search ............... 152/357 R, 357 A, 358, 152/359, 350; 156/123 R, 133

[56] References Cited

U.S. PATENT DOCUMENTS

| 3,677,318 | 7/1972 | Glass et al. | 152/358 X |
| 3,837,982 | 9/1974 | Di Paola | 152/358 X |

Primary Examiner—Robert B. Reeves
Assistant Examiner—Gene A. Church
Attorney, Agent, or Firm—Stevens, Davis, Miller & Mosher

[57] ABSTRACT

In the construction of monoply radial tires from a strip of fabric made up of strong warp cords and relatively light weft threads, the strip requires to be joined.

The invention provides ply warp anchoring of a butt by anchoring the joint with a cover strip of calendered threads similar to the weft and aligned parallel to the weft.

11 Claims, 4 Drawing Figures

MANUFACTURE OF TIRES

This invention relates to the manufacture of tires, and in particular to tires having a structure which includes a carcass composed of a single ply of cord fabric, the cords being orientated at substantially 90° to the tire mid-circumferential plane.

In the building of a tire from cord fabric it is conventional to build up the tire carcass in a substantially cylindrical configuration from sheets of cord fabric and subsequently to shape up this cylindrical pocket into toroidal form. Clearly, in converting the cylindrical pocket to toroidal form, that portion adjacent the beads of the tire remains at substantially the same diameter while the portion at the mid-circumferential plane is considerably increased in diameter. In the shaping of a carcass having two or more crossed plies of cords this diameter change results in trellising between the cords' plies which changes the bias angle of the cords.

In the case of a carcass composed of a single ply of cord fabric whose cords are orientated at substantially 90° to the mid-circumferential plane, this diameter change has to be accommodated by increased spacing of the cords within their rubber matrix, and in order to have uniform properties the tire requires uniform cord spacing at all points around its circumference.

A problem therefore arises in the manufacture of tires having a single ply of this kind in that the conventional building technique introduces a point of discontinuity, namely the joint where the ends of the ply of cord fabric meet, and here excessive warp spacing can occur in tire manufacture because of lack of warp anchoring across the joint if the joint is a butt joint. Anchoring of the warp cords by forming a lap joint has proved unacceptable because of nonuniformity of mechanical properties across the joint. Accordingly, the invention proposes a warp-anchored butt-joined tire carcass with minimal non-uniformity.

According to the present invention, a method for the manufacture of a tire including a carcass composed of a single ply of cord fabric wherein the cords are orientated at substantially 90° to the mid-circumferential plane of the tire, includes the steps of firstly assembling into a cylindrical pocket a ply of rubberized cord fabric including a warp of reinforcing cords and a weft of threads having a low tensile strength and a low elastic modulus relative to the warp cords, the warp cords being aligned substantially parallel to the axis of the cylinder, such that in said pocket the ends of said ply abut substantially without overlapping, secondly laying over the joint between the ends of said ply a cover strip of a sheet material comprising low tensile strength and low elastic modulus threads of mechanical properties similar to said weft threads and embedded in rubber compound, the strip being arranged such that its threads are orientated substantially at 90° to the ply joint, and thirdly shaping said pocket into toroidal form.

According also to the present invention there is provided a method of manufacturing a tire comprising the steps of firstly forming from a material having cords embedded in an uncured rubber, a cylinder having a joint forming a discontinuity extending substantially axially along the surface of the cylinder, said cords being aligned to extend substantially axially along the surface of said cylinder, and secondly placing over and along said joint a cover strip formed from material having threads embedded in an uncured rubber, said threads being aligned to extend substantially along the circumference of said cylinder.

The invention further provides a tire carcass composed of a single ply of cord fabric wherein the cords are orientated at substantially 90° to the mid-circumferential plane of the tire, said cord fabric being rubberized and including a warp of reinforcing cords and a weft of threads having a low tensile strength and a low elastic modulus relative to the warp cords, a ply of said fabric being assembled to have the ends of the ply abut substantially without overlapping, and laid over the joint a cover strip of a sheet material comprising low tensile strength and low elastic modulus threads of mechanical properties similar to said weft threads and embedded in rubber compound, the strip being aligned such that its threads are orientated substantially at 90° to the ply joint.

It has been found that presence of a cover strip of this type permits the cords of the ply adjacent to the joint to increase their spacing during the shaping operation in the same manner as the cords of the remainder of the ply, i.e., the threads in the cover strip provide a comparable measure of warp anchoring across the joint as the ply weft remote from the joint.

The invention is of particular use when the reinforcing cords (warp) of the carcass ply consist of relatively stiff, high elastic modulus cords such as steel cords, glass cords or aromatic polyamide cords.

Preferably the weft threads in the ply cord fabric and the threads in the cover strip are of the same material and have substantially the same cross-sectional dimensions. The physical properties of these threads are preferably in the following ranges:

| | |
|---|---|
| Tensile strength | 9 to 35 grams per tex |
| Modulus of elasticity | 10 to 300 grams per tex |
| Elongation at break | 30 to 250% |
| Linear density | 10 to 50 tex |

The preferred thread material is a polymeric thermoplastic fiber such as polyamide or polyester.

It is also preferred that the rubber compound of the cover strip in which the threads are embedded, e.g. by calendering, is the same as the topping compound on the cord fabric of the carcass ply.

Preferably, the cover strip is dimensioned so as not to extend over the full length of the joint such as to leave the remote ends of the joint free across the joint, whereby to facilitate the folding of the ply round bead wires in a subsequent stage of tire manufacture.

An embodiment of the invention will now be particularly described, by way of example only, with reference to the accompanying drawings in which.

Figure 1:
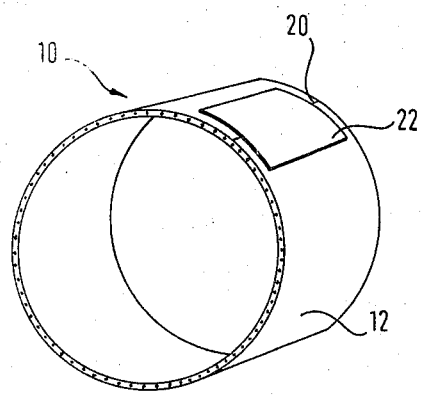
FIG. 1 is a perspective view of a partially formed tire carcass.
Figures 2, 3:
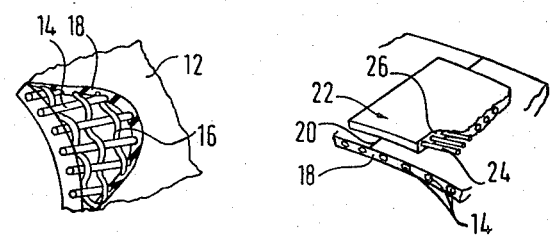
FIG. 2 is an enlarged view of to portion of FIG. 1.
FIG. 3 is an enlarged view of to portion of FIG. 1.

Referring now to FIG. 1, a tire carcass 10 is formed from a strip of rubberized material 12. As can best be seen in FIG. 2 the material 12 comprises a plurality of equally spaced warp cords 14 interwoven with a plurality of equally spaced weft threads 16. The cords 14 and threads 16 are embedded in a layer of uncured rubber 18 by any suitable process, for example calendering.

The material 12 is formed into a cylinder around a former, which for convenience is not shown, and the ends of the material 12 are butted together to form a joint 20 which is a discontinuity in the cylinder. The warp cords 14 are arranged to extend parallel with the axis of the cylinder.

A cover strip 22 is formed from a material having threads 24 embedded in a layer of uncured rubber 26 and is placed over the joint 20 such that the threads 24 extend around the circumference of the cylinder.

The threads 24 are identical to the weft threads 16 and the rubber 26 is similar to the rubber compound 18.

The cover strip 22 is dimensioned so as to leave the margins of the cylinder free as shown in FIG. 1. This enables the bead portions of the tire to be fitted later in the conventional manner.

Figure 4:
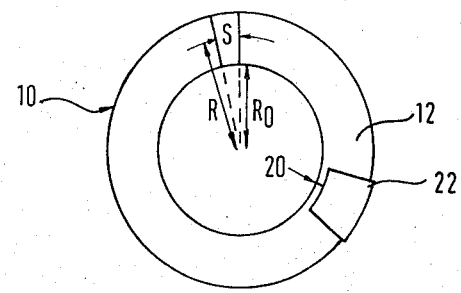
FIG. 4 is a side view of a completed but uncured tire carcass.

The tire carcass is shaped to the form shown in FIG. 4 by moving the edges of the cylinder toward one another and forcing the intermediate material axially outward. The cover strip 22 reinforces the joint 20 during the shaping operation to anchor the warp cords 14 across the joint 20 similar to the effect of the weft threads 16 remote from the joint 20, so that the spacing of the warp cords 14 is more uniform in the shaped carcass than would be the case if the cover strip 22 were not employed.

The separation of the warp cords 14 during shaping of the carcass follows the relationship:

$$S = (R - R_o)/R_o$$

where

S is the ratio of final warp spacing to initial warp spacing, $R_o$ is the initial radius of the carcass, and R is the radius at any point in the shaped tire.

By maintaining the cord spacing more uniform around any given circumference of the tire, a more consistent tire is produced which obviates common defects such as imbalance. Since the cover strip 22 need only have a minimal thickness there is little effect on the overall tire thickness in the region of the joint 20, and mechanical properties are substantially uniform around the tire.

I claim:

1. A method for the manufacuture of a tire which is substantially free of discontinuities in the circumferential direction including a carcass composed of a single ply of cord fabric wherein the cords are orientated at substantially 90° to the mid-circumferential plane of the tire, said method comprising the steps of firstly assembling into a cylindrical pocket a ply of rubberized cord fabric including a warp of reinforcing cords and a weft of threads having a low tensile strength and a low elastic modulus relative to the warp cords, the wrap cords being aligned substantially parallel to the axis of the cylinder, such that in said pocket the ends of said ply abut substantially without overlapping; secondly laying over the joint between the ends of said ply an unwoven cover strip of a sheet material comprising low tensile strength and low elastic modulus threads of mechanical properties similar to said weft threads and embedded in rubber compound, the strip being arranged such that its threads are orientated substantially at 90° to the ply joint, and thirdly shaping said pocket into toroidal form.

2. A method of manufacturing a tire which is substantially free of discontinuities in the circumferential direction comprising the steps of firstly forming from a material having cords embedded in an uncured rubber, a cylinder having a joint forming a discontinuity extending substantially axially along the surface of the cylinder, said cords being aligned to extend substantially axially along the surface of said cylinder, and secondly placing over and long said joint an unwoven cover strip formed from material having threads embedded in an uncured rubber, said threads being aligned to extend substantially along the circumference of said cylinder.

3. A tire carcass which is substantially free of discontinuities in the circumferential direction composed of a single ply of cord fabric wherein the cords are orientated at substantially 90° to the mid-circumferential plane of the tire, said cord fabric being rubberized and including a warp of reinforcing cords and a weft of threads having a low tensile strength and a low elastic modulus relative to the warp cords, a ply of said fabric being assembled to have the ends of the ply abut substantially without overlapping, and laid over the joint an unwoven cover strip of a sheet material comprising low tensile strength and low eleastic modulus threads of mechanical properties similar to said weft threads and embedded in rubber compound, the strip being aligned such that its threads are orientated substantially at 90° to the ply joint.

4. The tire carcass of claim 3 wherein the warp of reinforcing cords are relatively stiff, high elastic modulus cords selected from the group of steel cords, glass cords, and aromatic polyamide cords.

5. The tire carcass of claim 3 wherein the weft threads in the ply cord fabric and the threads in the cover strip are of the same material and have substantially the same cross-sectional dimensions.

6. The tire carcass of claim 3 wherein the physical properties of said weft threads and of said threads in the cover strip are in the following ranges:

| tensile strength | 9 to 35 grams per tex |
| modulus of elasticity | 10 to 300 grams per tex |
| elongation at break | 30% to 250% |
| linear density | 10 to 50 tex. |

7. The tire carcass of claim 3 wherein the material of the weft threads in the ply cord fabric and the material of the threads in the cover strip is a polymeric thermoplastic fiber.

8. The tire carcass of claim 7 wherein said material is a polyamide.

9. The tire carcass of claim 7 wherein said material is a polyester.

10. The tire carcass of claim 3 wherein the rubber compound of the cover strip is the same as the rubber of the cord fabric of the carcass ply.

11. The tire carcass of claim 3 wherein the cover strip is dimensioned to extend over the joint by less than the full length of the joint to leave remote ends of the joint free across the joint, whereby to facilitate the folding of the ply round bead wires in a subsequent stage of tire manufacture.

* * * * *

UNITED STATES PATENT AND TRADEMARK OFFICE
CERTIFICATE OF CORRECTION

PATENT NO. : 4,226,654
DATED : October 7, 1980
INVENTOR(S) : Maurice A. YOUNG

It is certified that error appears in the above-identified patent and that said Letters Patent are hereby corrected as shown below:

In the Abstract, line 4, after "butt" insert -- joint --.
Claim 1, line 10, correct "wrap" to -- warp --.
Claim 2, line 9, correct "long" to -- along --.

Signed and Sealed this

Thirty-first Day of March 1981

[SEAL]

Attest:

RENE D. TEGTMEYER

Attesting Officer

Acting Commissioner of Patents and Trademarks